United States Patent

[11] 3,576,469

[72] Inventors David H. McNitt
Royal Oak;
Allen H. Turner, Ann Arbor, Mich.
[21] Appl. No. 11,629
[22] Filed Feb. 16, 1970
[45] Patented Apr. 27, 1971
[73] Assignee Ford Motor Company
Dearborn, Mich.

[54] APPARATUS TO SENSE STEEP WAVE FRONT SIGNALS AND REACT TO PROTECT CIRCUITRY FROM DISCHARGE DAMAGE
10 Claims, 3 Drawing Figs.

[52] U.S. Cl.............................................. 317/18,
317/45, 317/51, 333/24
[51] Int. Cl...................................................... H02h 7/26,
H02h 3/26
[50] Field of Search........................................... 317/17, 18,
31, 44, 45, 51; 333/24

[56] References Cited
UNITED STATES PATENTS
3,287,603 11/1966 Sosnoski............................... 317/18
3,493,815 2/1970 Hurtle.................................... 317/45X

*Primary Examiner*—J. D. Miller
*Assistant Examiner*—Harvey Fendelman
*Attorneys*—John R. Faulkner and E. Dennis O'Connor

ABSTRACT: Apparatus for protecting high-voltage electrical equipment from damage due to unexpected and undesired discharges. The equipment includes power-consuming means supplied high-voltage electrical energy via a transmission cable having a central core and a core shield surrounding and spaced from the core. The apparatus comprises a length of core shield isolated and electrically insulated from the remainder of the core shield. The isolated length of core shield is connected electrically by circuit means to a high-speed circuit breaker located in the high-voltage power supply circuit. These circuit means include an electrical resistance and a high-speed signal detector and circuit breaker driver. Upon an unexpected discharge occurring in the electrical equipment, a voltage signal occurs across the resistance that is sensed by the high-speed detector and circuit breaker driver that then functions to actuate the circuit breaker. Actuation of the circuit breaker causes an interruption in the supply of high-voltage energy to the equipment.

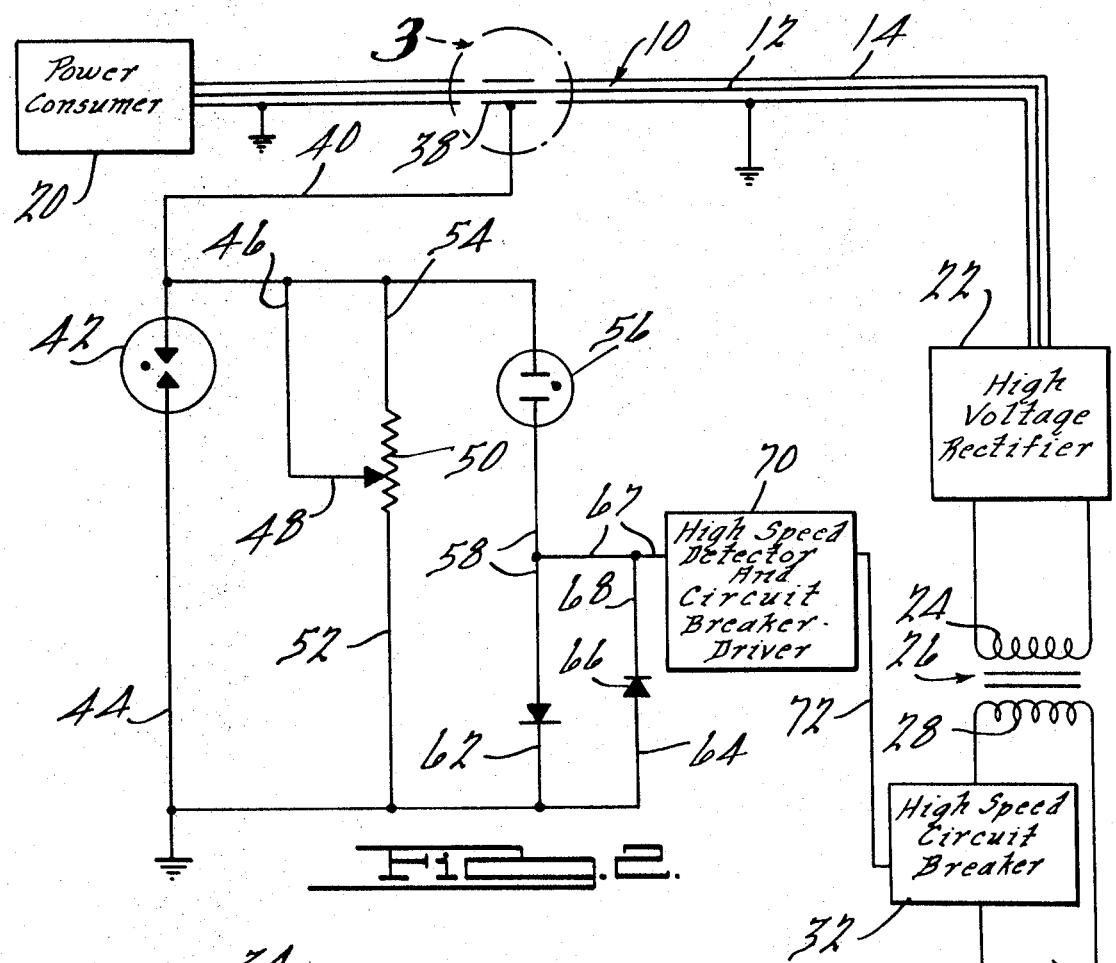
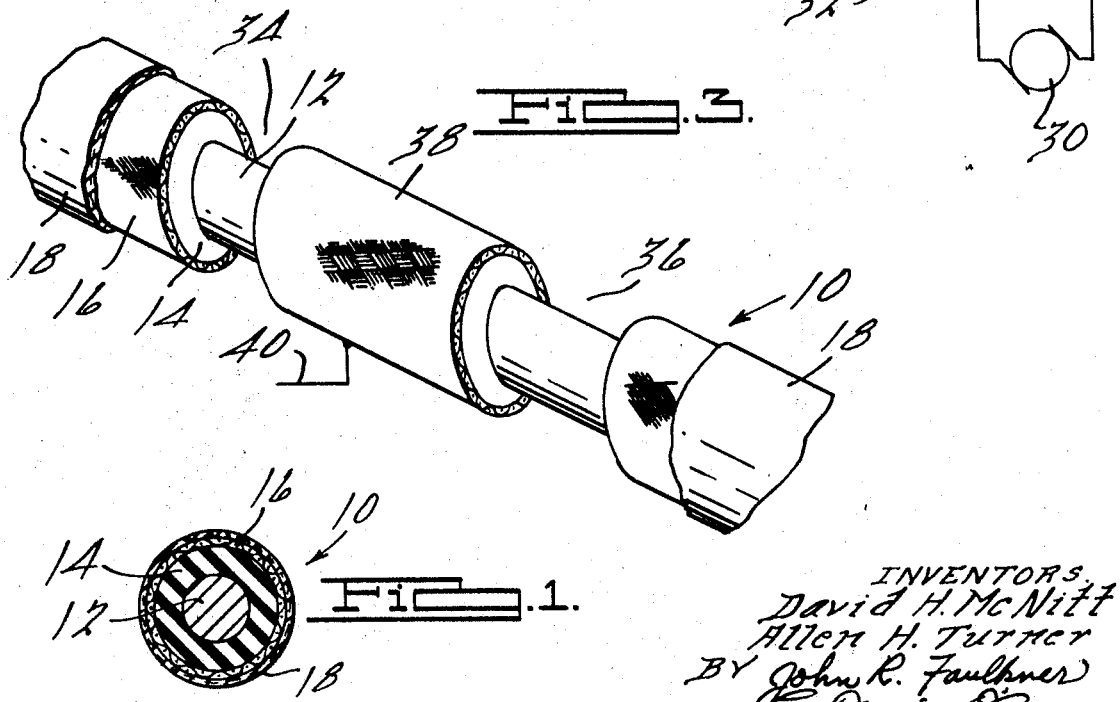

APPARATUS TO SENSE STEEP WAVE FRONT SIGNALS AND REACT TO PROTECT CIRCUITRY FROM DISCHARGE DAMAGE

BACKGROUND OF THE INVENTION

Discharge phenomena in high-voltage equipment due to malfunctions is a major cause of breakdowns of such equipment. Commonly, such breakdowns are accompanied by extensive damage to the equipment. In order to guard against such damage, it is necessary to provide means to sense a malfunction and interrupt the input of power to the equipment within a few milliseconds after the malfunction discharge.

Conventionally, high-voltage equipment is protected by electronic means that sense current and voltage overloads at the low-voltage side of the power input controls. Further, solid state devices and spark gaps are used to divert discharge energy along some preferred path to ground. These expedients also are located at the low-voltage portion of the equipment.

Such equipment protection arrangements have not proven wholly satisfactory. Overload sensing coupled with steps to shut down the equipment, as well as preferred energy discharge paths, do not operate with sufficient rapidity to prevent the discharge damage. The high capacitance and internal resistance of typical high-voltage circuits cause relatively large time lags between the occurrence of a malfunction and the operation of protective schemes as described above. This especially is true if the protective circuit elements are located on the low-voltage side of the power input, as dangerous malfunctions must often occur in the high-voltage circuit portions.

This invention takes advantage of the realization that, at least simultaneous to an equipment malfunction, a signal of the malfunction may be sensed in a high-voltage transmission cable supplying power-consuming means with electrical energy from a high-voltage source such as a transformer. It is an object of this invention to take advantage of this realization and provide apparatus for sensing this signal and using the signal to actuate a high-speed power shutoff device, thereby protecting the high-voltage equipment from discharge damage.

SUMMARY OF THE INVENTION

Apparatus constructed in accordance with this invention is adapted to protect high-voltage electrical equipment from damage due to sudden electrical discharge and is utilized with electrical equipment including a high-voltage supply circuit having a high-voltage rectifier and a high-voltage DC transmission cable interconnecting the supply circuit with power-consuming means. The transmission cable has a conductive central core and a grounded core shield surrounding, spaced from and coaxial with the core. The apparatus of this invention comprises a length of the core shield isolated from the remainder of the grounded core shield. A high-speed circuit breaker is connected in the high-voltage supply circuit and is capable of being actuated to interrupt the flow of electrical energy in the electrical equipment. Power control circuit means electrically interconnect the length of isolated core shield and the circuit breaker. These power control circuit means comprise sensing means for sensing a voltage pulse of predetermined magnitude and actuating the circuit breaker upon such a voltage pulse being sensed.

DESCRIPTION OF THE DRAWING

FIG. 1 is a cross-sectional view of a conventional high-voltage DC transmission cable included in the electrical equipment to be protected by the apparatus of this invention;

FIG. 2 is a schematic circuit diagram of the apparatus of this invention; and

FIG. 3 is an isometric view of that portion of FIG. 2 illustrated schematically within the circle 3.

DETAILED DESCRIPTION OF THE INVENTION

Referring now to the drawing and in particular to FIG. 1 thereof, the numeral 10 denotes generally a high-voltage transmission cable of conventional design used to convey direct current across extremely large potential differences. Transmission cable 10 includes a conductive core element 12 surrounded by a cylinder of electrical insulating material 14 such as polyethylene. Surrounding the insulating material 14 is a cylindrical core shield 16. Core shield 16 is formed from braided, conductive wire and is coaxial with the cable core 12. The outer layer of the cable comprises a heavy gauge wrapping 18 that may be paper or other suitable protective material.

Referring now to FIG. 2 of the drawing, it may be seen that transmission cable 10 as described above is used to interconnect a power-consuming device 20 with a high-voltage rectifier 22. The rectifier is part of the high-voltage power supply circuit of the high-voltage equipment. The rectifier 22 is connected to the high-voltage windings 24 of a transformer 26. The low-voltage windings 28 are connected to a suitable source of electrical energy 30 that may be an AC generator as illustrated or a commercial AC powerline. A high-speed circuit breaker 32 is interconnected between the power source 30 and low-voltage windings 28.

It readily may be appreciated that alternating current from current source 30 is increased in voltage by transformer 26 and is rectified to high-voltage direct current by rectifier 22. This direct current then is transported along high-voltage transmission cable 10 to the power consumer 20. A malfunction occurring in the power consumer, transmission cable 10 or high-voltage rectifier 22 easily could cause a discharge that would have the potential of seriously damaging this voltage equipment.

The apparatus provided by this invention for protecting the high-voltage equipment against such an occurrence may be appreciated by reference to FIGS. 2 and 3 of the drawing. It may be seen that along the length of transmission cable 10, the wire braid comprising the core shield 16 is cut away in two spaced-apart locations 34 and 36. A length 38 of core shield wire braid thus is isolated and electrically insulated from the remainder of the core shield that, of course, is grounded.

Isolated core shield length 38 cooperates with the conductive core 12 of transmission cable 10 to form a capacitor. Conductive core 12, during normal operation of the high-voltage equipment, is at a high negative potential. It has been observed that upon an unexpected and unwanted discharge due to an equipment malfunction, the potential of transmission cable core 12 moves toward ground and causes a discharge of the capacitor formed by core 12 and core shield length 38. This discharge causes a signal that is sensed by the protective apparatus of this invention.

Isolated core shield length 38 is interconnected by a conductive lead 40 to a spark gap 42 that is connected to ground by a lead 44. Lead 40 also is connected by a lead 46 to a control arm 48 of a variable resistance 50. One side of the resistance 50 is connected to ground by lead 52 while the other side of the resistance 50 is connected by lead 54 to a neon tube 56.

The side of the neon tube 56 remote from variable resistance 50 is connected by a lead 58 to a diode 60 that is connected to ground by lead 62. A conductive lead 64 interconnects ground with a diode 66 that is connected to a lead 67 by a lead 68. It may be observed that while diode 60 allows the flow of current toward ground, diode 64 allows flow of current only away from ground.

Conductive lead 67 interconnects both lead 58 and lead 68 to a high-speed signal detector and circuit breaker driver 70. Such a circuit element easily may be constructed by one having ordinary skill in the art. For example, a suitable high-speed detector and circuit breaker driver could comprise a silicon-controlled rectifier suitably protected by capacitance from high-voltage pulses. The high-speed signal detector and circuit breaker driver 70 is connected by a lead 72 to the high-speed circuit breaker 32 located in the power supply circuit as described above.

The operation of the apparatus described above is as follows. As explained above, the isolated length of core shield 38 cooperates with the core 12 to form a capacitance that will discharge upon an unwanted discharge in the high-voltage equipment. In the event that the discharge of this capacitor is extremely great, the spark gap 42 will conduct the discharge signal to ground through lead 44.

In any event, when a high-voltage fault occurs, the capacity of the isolated cable shield 38 is discharged producing a positive pulse across resistance 50. The magnitude of resistance 50 may be varied by movement of control arm 48 in order to adjust the sensitivity of the signal detecting apparatus.

When a positive pulse of sufficient magnitude is developed across resistance 50, it causes neon tube 56 to fire. The neon tube 56 operates as a threshold device. Diode 60 clamps the voltage in conductive lead 67 to a small potential that will cause satisfactory operation of the high-speed detector and circuit breaker driver 70. Diode 66 bypasses large negative voltages that are developed by ringing in the high-voltage circuit during a discharge.

The small voltage in conductive lead 67 is sensed by the high-speed detector and circuit breaker driver that, upon sensing the signal, causes the high-speed circuit breaker 32 to become operative. The circuit breaker 32 operates to open the power supply circuit, thereby shutting down the high-voltage equipment and saving this equipment from discharge damage. Many conventional high-speed circuit breakers available commercially will operate in a satisfactory manner as high-speed circuit breaker 32.

It thus may be seen that this invention provides apparatus for protecting high-voltage equipment from discharge damage. This protection is made possible by the realization that at least simultaneously with a malfunction discharge in high-voltage equipment energy may be capacitively coupled from the high-voltage equipment and sensed to operate a high-speed circuit breaker in the power supply circuit supplying power to the equipment.

We claim:

1. Apparatus for protecting high-voltage electrical equipment from damage due to sudden electrical discharge, said equipment including a high-voltage supply circuit and a high-voltage transmission cable interconnecting said supply circuit with power-consuming means, said cable having a conductive central core and a core shield surrounding, spaced from and coaxial with a first portion of said core, a second portion of said core being unshielded, said apparatus comprising: an electrically conductive element positioned in proximity with said second core portion such that said second core portion and said element form a capacitor, said conductive element being electrically connected to high-speed signal detector and circuit breaker driver means capable of sensing a signal and becoming energized upon discharge of said capacitor, and high-speed circuit breaker means, said circuit breaker means being an element of said high-voltage supply circuit and being interconnected with said signal detector and circuit breaker driver means, said circuit breaker means being operative to open said high-voltage supply circuit upon the energization of said signal detector and circuit breaker driver means.

2. Apparatus according to claim 1, further comprising an electrical resistance electrically connected between said conductive element and said signal detector and circuit breaker driver means, the latter sensing a voltage pulse across said resistance upon said capacitor being discharged.

3. Apparatus according to claim 1, wherein said conductive element comprises a length of said core shield isolated from the remainder of said core shield.

4. Apparatus according to claim 3, wherein said core shield is formed from braided wire.

5. Apparatus for protecting high-voltage electrical equipment from damage due to sudden electrical discharge, said equipment including a high-voltage supply circuit having a high-voltage rectifier and a high-voltage DC transmission cable interconnecting said supply circuit with power-consuming means, said cable having a conductive central core and a grounded core shield surrounding, spaced from and coaxial with said core, said apparatus comprising a length of said core shield isolated from the remainder of said grounded core shield, a high-speed circuit breaker connected in said high-voltage supply circuit and capable of being actuated to interrupt the flow of electrical energy to said electrical equipment, and power control circuit means electrically interconnecting the length of isolated core shield and said circuit breaker and comprising sensing means for sensing a voltage pulse of a predetermined magnitude in said control circuit means and actuating said circuit breaker upon said voltage pulse being sensed.

6. Apparatus according to claim 5, wherein said power control circuit means further comprises an electrical resistance electrically connected between said length of isolated core shield and said sensing means, said sensing means sensing a voltage pulse that occurs across said resistance.

7. Apparatus according to claim 5, wherein said core shield comprises a cylinder of braided wire.

8. Apparatus for protecting high-voltage electrical equipment from damage due to sudden electrical discharge, said equipment including a power-consuming means, a high-voltage transmission cable electrically connected to said power-consuming means and first circuit means electrically connected to said cable and supplying high-voltage electrical energy thereto, said cable having a conductive central core and a core shield surrounding and spaced from said core, said apparatus comprising a length of said core shield isolated and electrically insulated from the remainder of said core shield, a high-speed circuit breaker connected in said high-voltage supply circuit, and second circuit means electrically interconnecting said length of isolated core shield and said circuit breaker and comprising sensing means for sensing an electrical discharge from said length of isolated core shield and actuating said circuit breaker upon said discharge being sensed to interrupt the supply of electrical energy to said cable.

9. Apparatus according to claim 8, wherein said cable shield is coaxial with said core and is formed from braided wire.

10. Apparatus according to claim 8, wherein said second circuit means includes an electrical resistance connected between said length of isolated core shield and said sensing means, said discharge causing a voltage pulse across said resistance.